United States Patent
Kwak et al.

(10) Patent No.: US 12,394,084 B2
(45) Date of Patent: Aug. 19, 2025

(54) METHOD AND APPARATUS FOR LEARNING HUMAN POSE ESTIMATION IN LOW-LIGHT CONDITIONS

(71) Applicant: POSTECH RESEARCH AND BUSINESS DEVELOPMENT FOUNDATION, Pohang-si (KR)

(72) Inventors: Suha Kwak, Pohang-si (KR); Jaesung Rim, Pohang-si (KR); Byungju Woo, Pohang-si (KR); Geonu Kim, Pohang-si (KR); Sunghyun Cho, Pohang-si (KR); Sohyun Lee, Pohang-si (KR); Haechan Lee, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 204 days.

(21) Appl. No.: 18/364,823

(22) Filed: Aug. 3, 2023

(65) Prior Publication Data

US 2024/0371024 A1    Nov. 7, 2024

(30) Foreign Application Priority Data

May 4, 2023    (KR) .................. 10-2023-0058556

(51) Int. Cl.
  *G06T 7/70*    (2017.01)
  *H04N 23/16*   (2023.01)

(52) U.S. Cl.
  CPC .............. *G06T 7/70* (2017.01); *H04N 23/16* (2023.01); *G06T 2207/20081* (2013.01); *G06T 2207/20084* (2013.01); *G06T 2207/30196* (2013.01)

(58) Field of Classification Search
  CPC ............. G06T 7/70; G06T 2207/20081; G06T 2207/20084; G06T 2207/30196; G06T 7/73; G06T 2207/10152; H04N 23/16; G06V 40/103; G06V 10/141;
  (Continued)

(56) References Cited

U.S. PATENT DOCUMENTS

| 2020/0394759 A1 | 12/2020 | Luo et al. |
| 2022/0199258 A1 | 6/2022 | Yoo et al. |

(Continued)

FOREIGN PATENT DOCUMENTS

| KR | 10-1051716 B1 | 7/2011 |
| KR | 10-2021-0036840 A | 4/2021 |
| KR | 10-2021-0059612 A | 5/2021 |

OTHER PUBLICATIONS

Sohyun Lee et al., "Human Pose Estimation in Extremely Low-Light Conditions", Cornell University, submitted Mar. 27, 2023, 25 pages, arXiv:2303.15410v1 [cs.CV].

Primary Examiner — Yogesh K Aggarwal
(74) Attorney, Agent, or Firm — Sughrue Mion, PLLC

(57) ABSTRACT

Provided is an apparatus for learning human pose estimation by configuring a dataset for human pose estimation by simultaneously obtaining a well-lit image and a low-light image, performing annotation in the well-lit image, and transmitting the annotation to the low-light image. By using the well-lit image included in the dataset as an input of a teacher model and the low-light image as an input of a student model, the student model learns human pose estimation at a high accuracy in low-light conditions by using privileged information of the teacher model.

15 Claims, 4 Drawing Sheets

(58) Field of Classification Search
CPC ...... G06V 10/147; G06V 10/24; G06V 10/72; G06V 10/77; G06V 10/82; G06N 3/02
See application file for complete search history.

(56)     References Cited

U.S. PATENT DOCUMENTS

| | | | |
|---|---|---|---|
| 2023/0145208 A1* | 5/2023 | Bobu | G06N 20/00 |
| | | | 706/12 |
| 2023/0298330 A1* | 9/2023 | Chan | G06V 10/776 |
| | | | 382/159 |
| 2024/0320493 A1* | 9/2024 | Iscen | G06N 3/084 |

\* cited by examiner

METHOD AND APPARATUS FOR LEARNING HUMAN POSE ESTIMATION IN LOW-LIGHT CONDITIONS

CROSS-REFERENCE TO RELATED APPLICATIONS

This application is based on and claims priority under 35 U.S.C. § 119 to Korean Patent Application No. 10-2023-0058556, filed on May 4, 2023, in the Korean Intellectual Property Office, the disclosure of which is incorporated by reference herein in its entirety.

BACKGROUND

1. Field

The disclosure relates to a method of estimating a human pose. More specifically, the disclosure relates to a method of learning human pose estimation in low-light conditions. This study has been carried out under the Samsung Future Technology Development Project (Task Number: SRFC-IT1801-05).

2. Description of the Related Art

Human posture estimation refers to a method of estimating the positions of human joints in an image, and is used in autonomous vehicles, surveillance camera systems, etc. Low-light images captured in low-light conditions such as at night are largely damaged by deterioration such as low exposure, noise, blur, etc., making it difficult to perform human posture estimation.

Conventionally, a method has been used in which a low-light image is reconstructed to a well-lit image or a low-light image and a well-lit image that are not paired are merged. However, a technique for improving a low-light image to a well-lit image has a problem of excessive computation. Moreover, a method of estimating a human pose using a NOD dataset or an ARID dataset merely provides a low-light image for training, failing to achieve a high accuracy and resulting in a limitation of not learning extremely low-light conditions.

PRIOR TECHNICAL DOCUMENT

Patent Document

KR 10-2021-0036840 A

SUMMARY

Provided is a dataset capable of being used for estimating a human pose in extremely low-light conditions.

Provided is a method of learning human pose estimation in low-light conditions.

Additional aspects will be set forth in part in the description which follows and, in part, will be apparent from the description, or may be learned by practice of the presented embodiments of the disclosure.

According to an aspect of the disclosure, a method of learning human pose estimation in low-light conditions includes configuring, by a dataset establishing unit, a dataset by using a well-lit image $I^{well}$ and a low-light image $I^{low}$ in the form of a pair ($I^{well}$, $I^{low}$) and receiving, by a student model, the low-light image flow of the dataset by adjusting the low-light image $I^{low}$ with a preset pixel value and receiving, by a teacher model, the well-lit image $I^{well}$ of the dataset, in a learning unit, the student model and the teacher model being trained by a common human pose estimation loss and the student model being trained by simulating learning using privileged information (LUPI), in which the teacher model and the student model use separate batch normalization parameters and share other parameters with each other in a neural network.

In an embodiment, learning may be performed based on a privileged information use learning loss Image, such that a Gram matrix of the student model follows a Gram matrix of the teacher model to reduce a style gap between a feature map of the well-lit image $I^{well}$ and a feature map of the low-light image $I^{low}$.

In an embodiment, the well-lit image $I^{well}$ and the low-light image $I^{low}$ may be simultaneously captured by an image capturing apparatus which includes a first camera module configured to capture a well-lit image, a second camera module configured to capture a low-light image through a neural density (ND) filter, and a beam splitter configured to uniformly distribute light entering a lens to the first camera module and the second camera module.

The image capturing apparatus may obtain the well-lit image $I^{well}$ and the low-light image low in the form of the pair ($I^{well}$, $I^{low}$) by simultaneously capturing the well-lit image and the low-light image using a synchronized shutter. Geometric errors of the well-lit image $I^{well}$ and the low-light image $I^{low}$ may be adjusted by using a homography matrix.

In an embodiment, the well-lit image $I^{well}$ and the low-light image $I^{low}$ may be input to the neural network in the form of the pair ($I^{well}$, $I^{low}$) and processed in different batch normalization layers using different batch normalization schemes.

According to another aspect of the disclosure, an apparatus for learning human pose estimation in low-light conditions includes a dataset establishing unit configured to configure a dataset by using a well-lit image $I^{well}$ and a low-light image $I^{low}$ in the form of a pair ($I^{well}$, $I^{low}$) and a learning unit configured such that a student model receives the low-light image $I^{low}$ of the dataset by adjusting the low-light image $I^{low}$ with a preset pixel value and a teacher model receives the well-lit image $I^{well}$ of the dataset, the student model and the teacher model being trained by a common human pose estimation loss and the student model being trained by simulating learning using privileged information (LUPI), in which the teacher model and the student model use separate batch normalization layers and share other parameters with each other, in a neural network.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
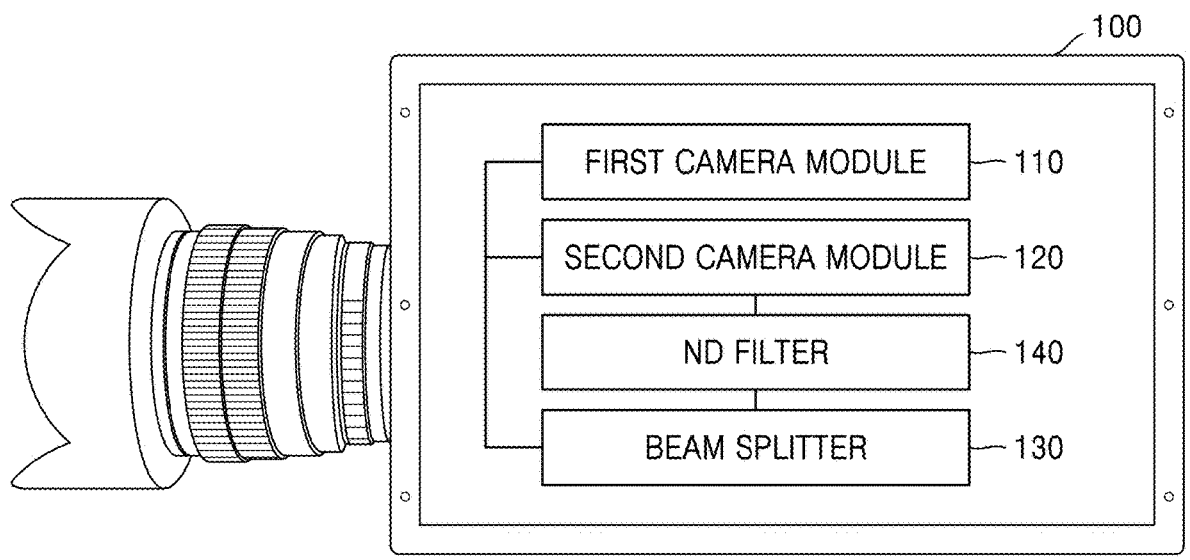
FIG. 1 shows an internal structural diagram of an image capturing apparatus used to establish a dataset for human pose estimation in low-light conditions, according to an embodiment.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects of the present description.

Hereinafter, a description will be made with reference to the drawings.

FIG. 1 is an internal structural diagram of an image capturing apparatus used to establish a dataset for human pose estimation in low-light conditions, according to an embodiment.

In an embodiment, an image capturing apparatus 100 may include a lens, two camera modules 110 and 120, a beam splitter 130, and a neural density (ND)-filter 140.

The image capturing apparatus 100 according to the disclosure may simultaneously obtain a well-lit image and a low-light image from the same scene. More specifically, the beam splitter 130 may uniformly distribute light entering the lens to the two camera modules 110 and 120. Of the two camera modules 110 and 120, a first camera module 110 may capture the well-lit image and a second camera module 120 may capture the low-light image. In FIG. 1, positions of the first camera module 110 and the second camera module 120 may be interchanged with each other.

The second camera module 120 may capture a low-light image that is dark 100 times an image captured by the first camera module 110, by reducing the amount of light entering from the beam splitter 130 by, for example, 100 times using the ND filter 140.

The image capturing apparatus 100 may simultaneously capture a well-lit image $I^{well}$ and a low-light image $I^{low}$ from the two camera modules 110 and 120 by using a synchronized shutter to obtain them in the form of a pair ($I^{well}$, $I^{low}$) and store the same in a memory.

Figure 2:
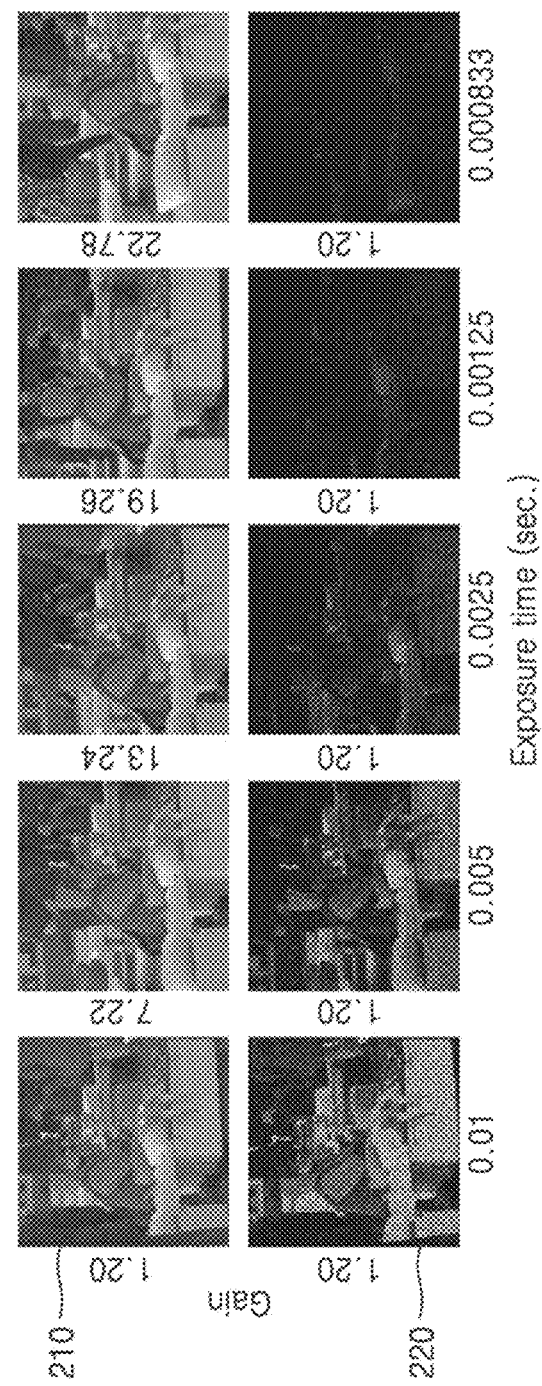
FIG. 2 shows a pair of a well-lit image and a low-light image obtained at the same time by an image capturing apparatus, according to an embodiment.

FIG. 2 shows a pair ($I^{well}$, $I^{low}$) of a well-lit image $I^{well}$ 210 and a low-light image $I^{low}$ 220, obtained by adjusting an exposure time and a gain value of the camera modules 110 and 120 in the image capturing apparatus 100, according to an embodiment. In FIG. 2, the low-light image 220 is a result of scaling by 30 times for visualization. The well-lit image $I^{well}$ 210 and the low-light image $I^{low}$ 220 may be aligned by adjusting a geometric error using a homography matrix, etc.

In an embodiment, an apparatus 300 for learning human pose estimation may obtain annotations by applying a general human pose estimation technique to the well-lit image $I^{well}$ 210. When there is an error in the obtained annotations, additional modification may be possible. The apparatus 300 for learning human pose estimation may use, in the low-light image $I^{low}$ 220, the annotations obtained and modified in the well-lit image $I^{well}$ 210.

Figure 3:
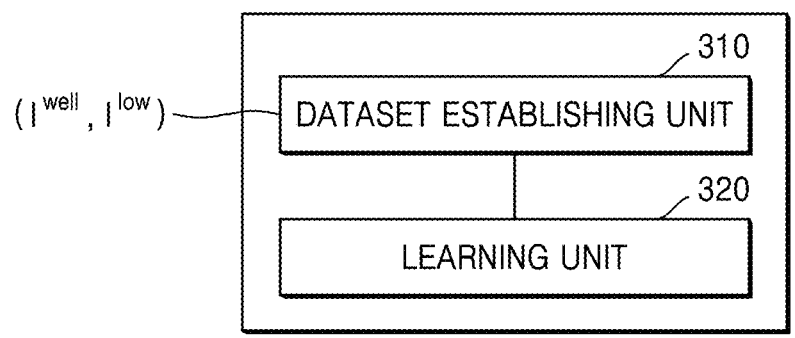
FIG. 3 shows an internal structural diagram of an apparatus for learning human pose estimation, according to an embodiment.

FIG. 3 is an internal structural diagram of the apparatus 300 for learning human pose estimation, according to an embodiment.

Figure 4:
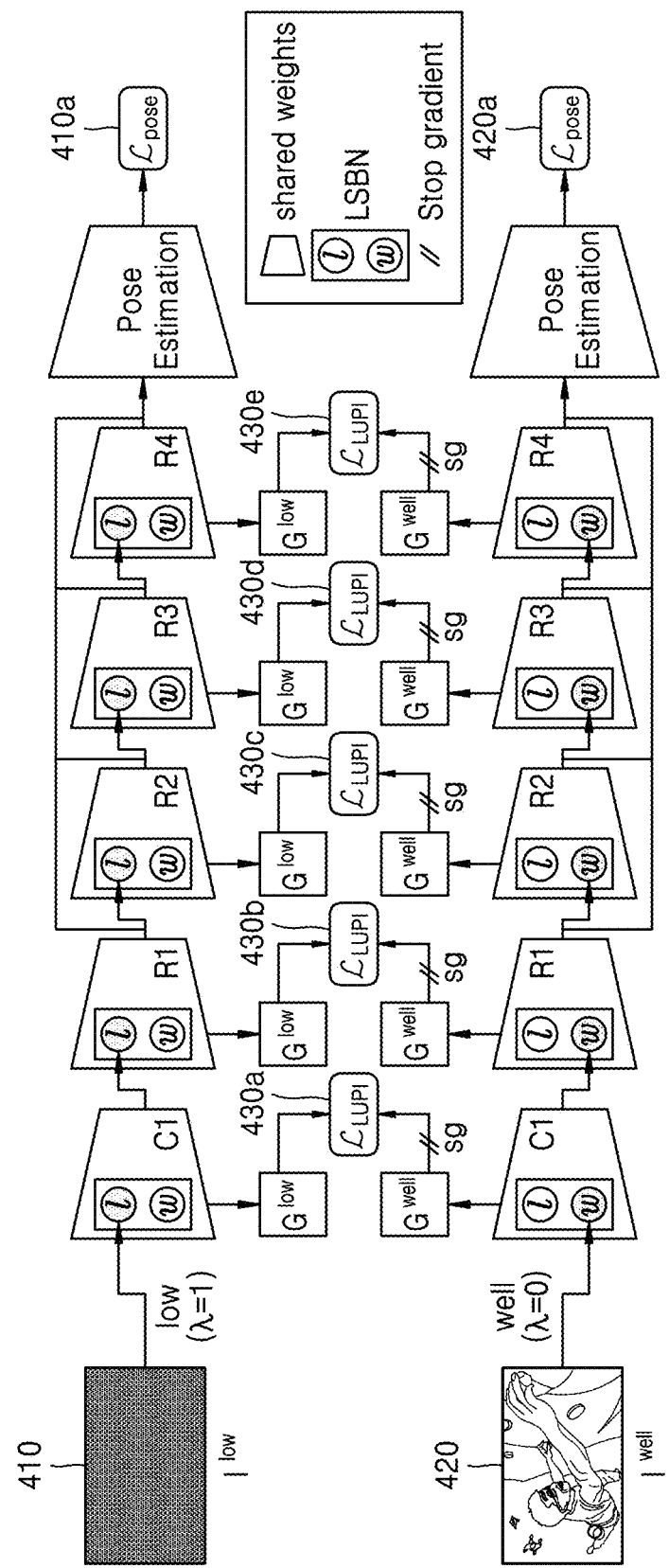
FIG. 4 shows a process of learning human pose estimation through a neural network by an apparatus for learning human pose estimation, according to an embodiment.

The apparatus 300 for learning human pose estimation may generate a dataset by using a well-lit image and a low-light image simultaneously obtained by an image capturing apparatus shown in FIG. 1. Referring to FIG. 4, the apparatus 300 for learning human pose estimation may learn the same human pose estimation losses $\mathcal{L}_{pose}$ 410a and 420a respectively from a teacher model using a well-lit image and a student model using a low-light image, in which the student model is trained to predict a human pose while simulating learning using privileged information (LUPI) 430a, 430b, 430c, 430d, and 430e of the teacher model.

A description will be made with reference to an internal configuration of the apparatus 300 for learning human pose estimation.

The apparatus 300 for learning human pose estimation may include a dataset establishing unit 310 and a learning unit 320.

The dataset establishing unit 310 may use a pair ($I^{well}$, $I^{low}$) of the well-lit image $I^{well}$ and the low-light image $I^{low}$ simultaneously obtained in the image capturing apparatus 100 as a dataset for learning human pose estimation. In this case, the low-light image $I^{low}$ may use annotation information with a high accuracy obtained from the well-lit image $I^{well}$ corresponding thereto.

The apparatus 300 for learning human pose estimation may use a low-light image to learn human pose estimation, resulting in a low image quality and thus making learning difficult. To solve this problem, the learning unit 320 may use a teacher-student model based on knowledge distillation. In the learning unit 320, the teacher model may receive a well-lit image of a dataset. The student model may adjust a low-light image of the dataset with a preset pixel value and receive the low-light image. The preset pixel value may be, for example, 0.4.

In the learning unit 320, the student model and the teacher model are trained by a common human pose estimation loss like Equation 1. The low-light image and the well-lit image are images obtained by capturing the same scene, such that the low-light image may share an annotated value of the well-lit image as a correct answer to a human pose. Moreover, the student model is trained to predict a human pose while simulating LUPI of the teacher model.

$$\mathcal{L}_{pose}(P, Y) = \frac{1}{K}\sum_{i=1}^{K}\|P_i - Y_i\|_2^2 \quad \text{[Equation 1]}$$

In Equation 1, Pi and Yi respectively denote a predicted heatmap and a prediction value for an ith joint, and K refers to the number of joints.

Referring to FIG. 4, in an apparatus 400 for learning human pose estimation, the student model and the teacher model are trained by the same human pose estimation losses $\mathcal{L}_{pose}$ 410a and 420a to estimate a correct answer to a common pose. The student model is additionally supervised to simulate the LUPI 430a, 430b, 430c, 430d, and 430e of the teacher model.

FIG. 4 is an internal structural diagram of an apparatus for learning human pose estimation in which a student model and a teacher model are integrated, according to an embodiment.

In the apparatus 400 for learning human pose estimation, the student model and the teacher model respectively use separate batch normalization parameters in a neural network and share different parameters with each other in the neural network. In FIG. 4, a weight is shown as an example of another parameter in the neural network.

The apparatus 400 for learning human pose estimation in which the student model and the teacher model are integrated may separate a batch normalization layer as in Equation 2.

According to an embodiment, the dataset for human pose estimation may be configured by simultaneously obtaining the well-lit image and the low-light image, performing annotation in the well-lit image, and transmitting the annotation to the low-light image.

According to an embodiment, the teacher-student model is configured such that the student model receives the low-light image and the teacher model receives the well-lit image, and the student model and the teacher model may be trained by the common human pose estimation loss and the student model may train the neural network to receive privileged information of the teacher model to learn human pose estimation at a high accuracy in the low-light conditions.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of learning human pose estimation in low-light conditions, the method comprising:
   configuring, by a dataset establishing unit, a dataset by using a well-lit image $I^{well}$ and a low-light image $I^{low}$ in the form of a pair ($I^{well}$, $I^{low}$); and
   receiving, by a student model, the low-light image $I^{low}$ of the dataset by adjusting the low-light image $I^{low}$ with a preset pixel value and receiving, by a teacher model, the well-lit image $I^{well}$ of the dataset, in a learning unit, the student model and the teacher model being trained by a common human pose estimation loss and the student model being trained by simulating learning using privileged information (LUPI),
   wherein the teacher model and the student model use separate batch normalization parameters and share other parameters with each other in a neural network.

2. The method of claim 1, wherein learning is performed based on a privileged information use learning loss $\pounds_{LUPI}$, such that a Gram matrix of the student model follows a Gram matrix of the teacher model to reduce a style gap between a feature map of the well-lit image $I^{well}$ and a feature map of the low-light image $I^{low}$.

3. The method of claim 1, wherein the well-lit image $I^{well}$ and the low-light image $I^{low}$ are input to the neural network in the form of the pair ($I^{well}$, $I^{low}$) and processed in different batch normalization layers using different batch normalization schemes.

4. The method of claim 1, wherein the well-lit image $I^{well}$ and the low-light image $I^{low}$ are captured at the same time.

5. The method of claim 1, wherein the well-lit image $I^{well}$ and the low-light image $I^{low}$ are obtained by capturing same scene at the same time, and geometric errors of the well-lit image $I^{well}$ and the low-light image $I^{low}$ are adjusted by using a homography matrix.

6. The method of claim 4, wherein the well-lit image $I^{well}$ and the low-light image $I^{low}$ are simultaneously captured by an image capturing apparatus which comprises:
   a first camera module configured to capture a well-lit image;
   a second camera module configured to capture a low-light image through a neural density (ND) filter; and
   a beam splitter configured to uniformly distribute light entering a lens to the first camera module and the second camera module.

7. The method of claim 4, wherein the image capturing apparatus obtains the well-lit image and the low-light image in the form of the pair ($I^{well}$, $I^{low}$) by simultaneously capturing the well-lit image and the low-light image using a synchronized shutter.

8. The method of claim 1, wherein learning is performed such that a prediction value of the human pose estimation loss in the low-light image is similar to a result of performing annotation processing in the well-lit image.

9. An apparatus for learning human pose estimation in low-light conditions, the apparatus comprising:
   a dataset establishing unit configured to configure a dataset by using a well-lit image $I^{well}$ and a low-light image $I^{low}$ in the form of a pair ($I^{well}$, $I^{low}$); and
   a learning unit configured such that a student model receives the low-light image $I^{low}$ of the dataset by adjusting the low-light image $I^{low}$ with a preset pixel value and a teacher model receives the well-lit image $I^{well}$ of the dataset, the student model and the teacher model being trained by a common human pose estimation loss and the student model being trained by simulating learning using privileged information (LUPI),
   wherein the teacher model and the student model use separate batch normalization layers and share other parameters with each other in a neural network.

10. The apparatus of claim 9, wherein the learning unit is further configured to perform learning, based on a privileged information use learning loss $\pounds_{LUPI}$, such that a Gram matrix of the student model follows a Gram matrix of the teacher model to reduce a style gap between a feature map of the well-lit image $I^{well}$ and a feature map of the low-light image $I^{low}$.

11. The apparatus of claim 9, wherein the learning unit is further configured to perform learning such that a prediction value of the human pose estimation loss in the low-light image $I^{low}$ is similar to a result of performing annotation processing in the well-lit image $I^{well}$ captured simultaneously with the low-light image.

12. The apparatus of claim 9, wherein the well-lit image $I^{well}$ and the low-light image $I^{low}$ are input to the neural network in the form of the pair ($I^{well}$, $I^{low}$) and processed in different batch normalization layers using different batch normalization schemes.

13. The apparatus of claim 9, wherein the well-lit image $I^{well}$ and the low-light image $I^{low}$ are simultaneously captured by an image capturing apparatus which comprises:
   a first camera module configured to capture a well-lit image;
   a second camera module configured to capture a low-light image through a neural density (ND) filter; and
   a beam splitter configured to uniformly distribute light entering a lens to the first camera module and the second camera module.

14. The apparatus of claim 9, wherein the learning unit is further configured to perform learning such that a prediction value of the human pose estimation loss in the low-light image $I^{low}$ is similar to a result of performing annotation processing in the well-lit image $I^{well}$.

15. The apparatus of claim 9, wherein the learning unit is further configured to perform learning such that a prediction value of the human pose estimation loss in the low-light image $I^{low}$ is similar to a result of performing annotation processing in the well-lit image $I^{well}$.

\* \* \* \* \*